United States Patent [19]
Crayford

[11] Patent Number: 5,404,544
[45] Date of Patent: Apr. 4, 1995

[54] SYSTEM FOR PERIODICALLY TRANSMITTING SIGNAL TO/FROM SLEEPING NODE IDENTIFYING ITS EXISTENCE TO A NETWORK AND AWAKENING THE SLEEPING NODE RESPONDING TO RECEIVED INSTRUCTION

[75] Inventor: Ian Crayford, San Jose, Calif.

[73] Assignee: Advanced Micro Devices, Sunnyvale, Calif.

[21] Appl. No.: 894,016

[22] Filed: Jun. 5, 1992

[51] Int. Cl.⁶ .......................... G06F 13/38; G06F 1/30
[52] U.S. Cl. .................................... 395/750; 395/200; 340/825.34; 364/242.94; 364/282.4; 364/948.8; 364/DIG. 1
[58] Field of Search ................................. 395/200, 750; 370/100.1; 307/10.1; 340/825.06, 825.07, 825.34; 371/66

[56] References Cited

U.S. PATENT DOCUMENTS

| | | | |
|---|---|---|---|
| 4,598,275 | 7/1986 | Ross et al. | 340/825.31 X |
| 4,691,202 | 9/1987 | Denne et al. | 340/825.54 |
| 4,698,748 | 10/1987 | Juzswik et al. | 364/200 |
| 4,875,158 | 10/1989 | Ashkin et al. | 395/275 |
| 4,903,016 | 2/1990 | Murai et al. | 340/825.07 |
| 4,987,317 | 1/1991 | Pournain et al. | 307/40 |
| 4,996,706 | 2/1991 | Cho | 379/93 |
| 5,182,746 | 1/1993 | Hurlbut et al. | 370/100.1 |
| 5,196,728 | 3/1993 | Jaux | 307/10.1 |
| 5,255,306 | 10/1993 | Melton | 379/38 |
| 5,317,309 | 5/1994 | Vercellotti et al. | 340/825.54 |

FOREIGN PATENT DOCUMENTS

| | | |
|---|---|---|
| 0343630 | 5/1989 | European Pat. Off. . |
| 9203004 | 2/1992 | WIPO . |

OTHER PUBLICATIONS

Ian Crayford "10BASE-T in the Office" Nov. 20, 1991.

Primary Examiner—Thomas C. Lee
Attorney, Agent, or Firm—Steven F. Caserza

[57] ABSTRACT

One of the fundamental benefits of the 10BASE-T physical interface for 802.3/Ethernet is that the health of the communications link can be permanently monitored. When in the "link good" condition, the 10BASE-T transceiver is required to output a link status (LNKST) signal to this effect. Media Access Controller (MAC) 30, with an embedded 10BASE-T transceiver (37), uses the LNKST signal to provide power management to the MAC (30). By using the programmable AWAKE bit, the receive section of the 10BASE-T transceiver (37) can remain powered, even if the SLEEP input to the MAC (30) is activated. This allows the transceiver (37) to detect a link beat pulse (60) or receive packet activity. If either receive condition is encountered, the internal transceiver (37) will activate the LNKST output from the MAC (30). The system hardware and/or software can use the LNKST output to take appropriate action. For instance, if the LNKST output is active (low), then the computer is connected to an active network, and it is likely that the operating system will allow the MAC (30) to remain powered. However, if the LNKST becomes inactive (high) then the system can assume that the link is inactive, and the MAC can be powered down to save power. If at a later time the link is re-established, the MAC (30) can be powered back up to take advantage of the communications channel. In this way, the power consumption of the Ethernet connection can be managed by the operating software/hardware.

16 Claims, 4 Drawing Sheets

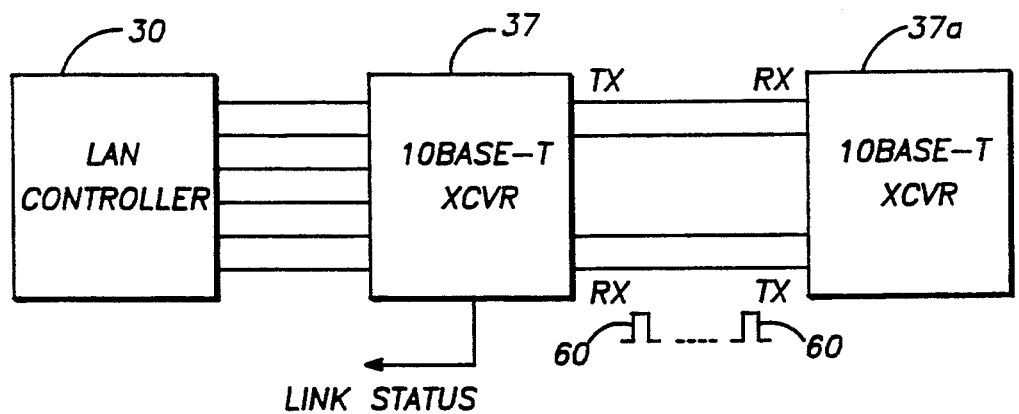
FIG.-2
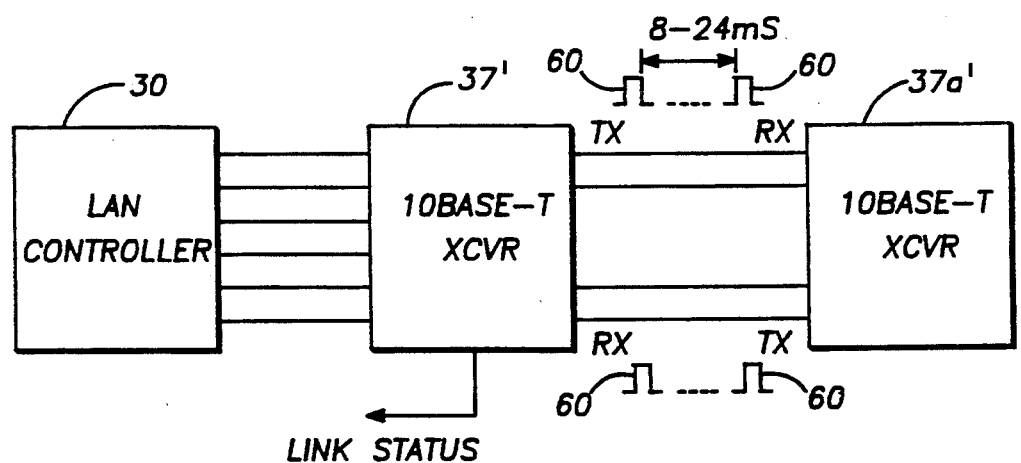
FIG.-3
| LNKFL | DLNKTST | REVPOL | DAPC | LRT | ASEL | RWAKE | AWAKE |
FIG.-4

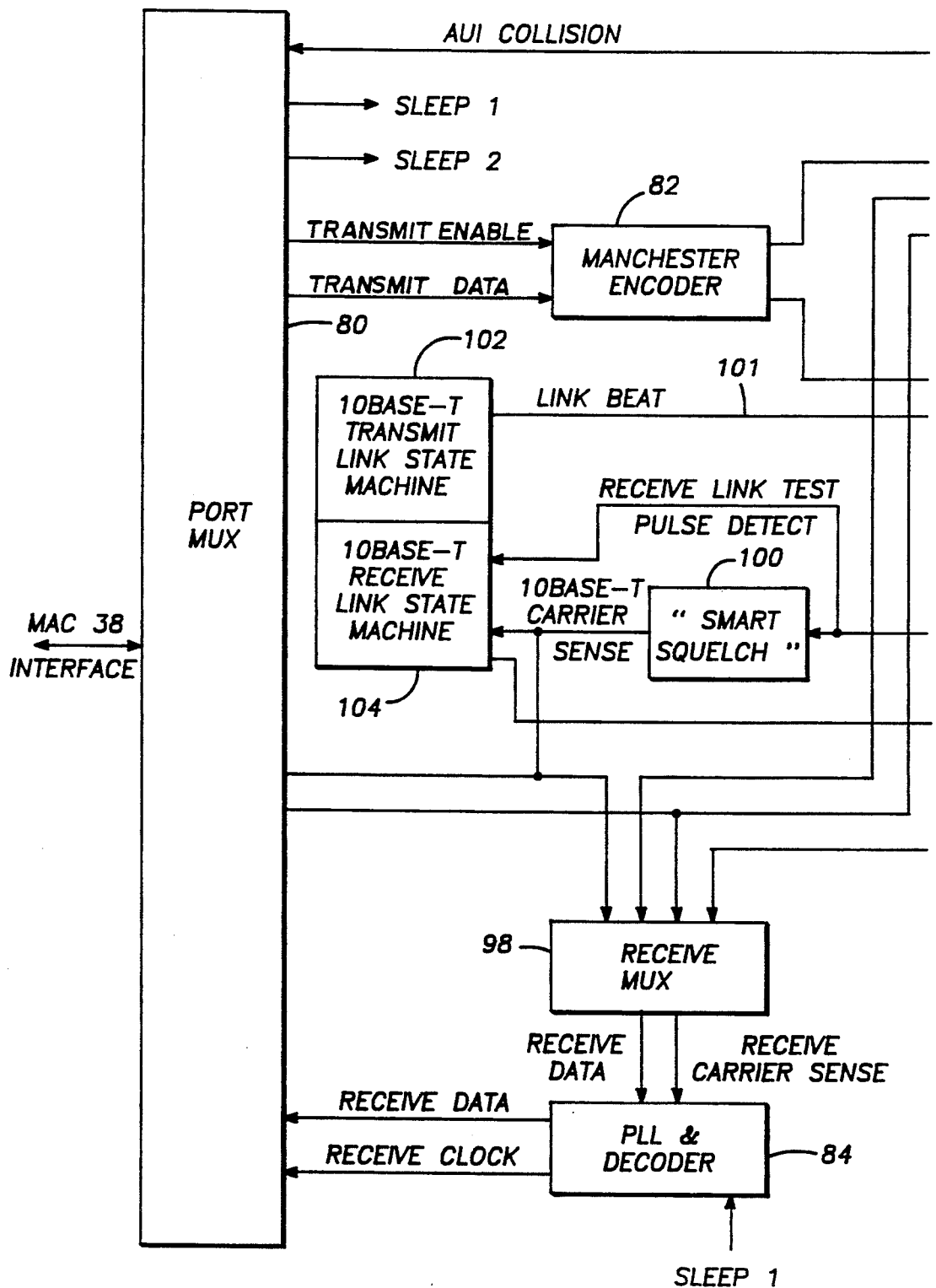
FIG.—5A

SYSTEM FOR PERIODICALLY TRANSMITTING SIGNAL TO/FROM SLEEPING NODE IDENTIFYING ITS EXISTENCE TO A NETWORK AND AWAKENING THE SLEEPING NODE RESPONDING TO RECEIVED INSTRUCTION

BACKGROUND OF THE INVENTION

1. Field of the Invention

The present invention relates generally to a system and method for automatic connection and disconnection of a node in a local area network (LAN) to manage power of a LAN controller. More particularly, it relates to such a system and method as implemented with an Ethernet network employing a transmitter/receiver (transceiver) which meets the ANSI/IEEE 802.3 10BASE-T international standard. Most especially, it relates to such a system and method implemented in a media access controller (MAC) for 802.3/Ethernet, also known as MACE, implemented in an integrated circuit including the 10BASE-T transceiver.

2. Description of the Prior Art

Ethernet is a commonly used local area network scheme in which multiple stations are connected to a single shared serial data path. Typically, only one station can transmit data onto the path at a time. A station connected to the path transmits data in the form of a packet that includes a destination address. The packet propagates throughout the network medium and is received by all other stations. The addressed station copies the entire packet as it goes by; the others reject the packet after determining that it is addressed to another station.

A Media Access Controller (MAC) serves as an interface between a shared data path and the stations connected to that path. Each node connected to the network includes a MAC which performs a number of functions involved in the transmission and reception of data packets. For example, during the transmission of data, the MAC assembles the data to be transmitted into a packet with address and error detection fields. Conversely, during the reception of a packet, the MAC disassembles the packet and performs address checking and error detection. In addition, the MAC typically performs encoding/decoding of digital signals transmitted over the shared path and performs preamble generation/removal as well as bit transmission/reception.

Traditional Ethernet is a coaxial wired system. The coaxial cable provides a linear bus to which all nodes are connected. Signalling is accomplished using a current sink technique with the center conductor used for signal, and the shield as a ground reference.

Twisted pair Ethernet in accordance with IEEE Standard 802.3 10BASE-T is able to use standard voice grade telephone cable employing separate transmit and receive pairs (4 wires). The system uses a star topology. At the center of the star is a "repeater". The repeater (or hub) performs signal amplitude and timing restoration. It takes an incoming bit stream and repeats it to all other ports connected to it (but not back to the originating port). In this sense, the repeater acts as "logical coax", so that any node connected to the network will see another's transmission. Differential signalling is employed with one pair acting as the transmit path, and the other as receive. Further details on 10BASE-T Ethernet networks, including a description of the state of the art for such networks, is provided by Crayford, "10BASE-T in the Office," Wescon, San Francisco, Nov. 20, 1991, the disclosure of which is hereby incorporated by reference herein.

Transceivers as used in 10BASE-T Ethernet networks may incorporate a sleep mode, in which a node incorporating the transceiver powers down when there is no activity for it after a predetermined period of time. However, when the node is in the sleep mode, it will miss any transmissions intended for it. It would be desirable to provide the power saving advantages of the sleep mode without resulting in missed transmissions. Efficient network management also requires that nodes on a network be identified as present. With prior art sleep modes, a network controller of a node in sleep mode is treated as if it were disconnected from the network.

SUMMARY OF THE INVENTION

Accordingly, it is an object of this invention to provide a system and method in which a data processing network controller will operate in a sleep mode to conserve power, but in which a portion of the controller remains active to monitor for transmissions.

It is another object of the invention to provide such a system and method in which power consumption of a network connection is managed by operating software/hardware.

It is still another object of the invention to provide a system and method in which a data processing network controller is used to power down a terminal on a network from a central network system and in which the terminal can also be powered up from the central network system.

It is a further object of the invention to provide such a system and method in which a portion of the network controller remains active to signal its presence to the network during the sleep mode.

The attainment of these and related objects may be achieved through use of the novel auto-wake up system and method herein disclosed. A network connection system in accordance with this invention has a network controller with a sleep mode and a transceiver for connecting the network controller to a data processing network. The network controller is configured for allowing a sleep mode for a data processing node connected to the network controller. The transceiver is configured to monitor for transmissions on the data processing network intended for the data processing node.

A network connection method in accordance with this invention includes connecting a data processing node to a data processing network through a network controller and a transceiver. The data processing node is allowed to assume a sleep mode. The data processing network is monitored with the transceiver for transmissions intended for the data processing node.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 2 is a more detailed block diagram of a portion of the media access controller incorporating the invention, connected in a network.

FIG. 3 is a block diagram corresponding to FIG. 2 of an alternative embodiment of the invention, connected in a network.

FIG. 4 is a diagram showing control bit assignments for practice of the invention.

DETAILED DESCRIPTION OF THE INVENTION

Figure 1:
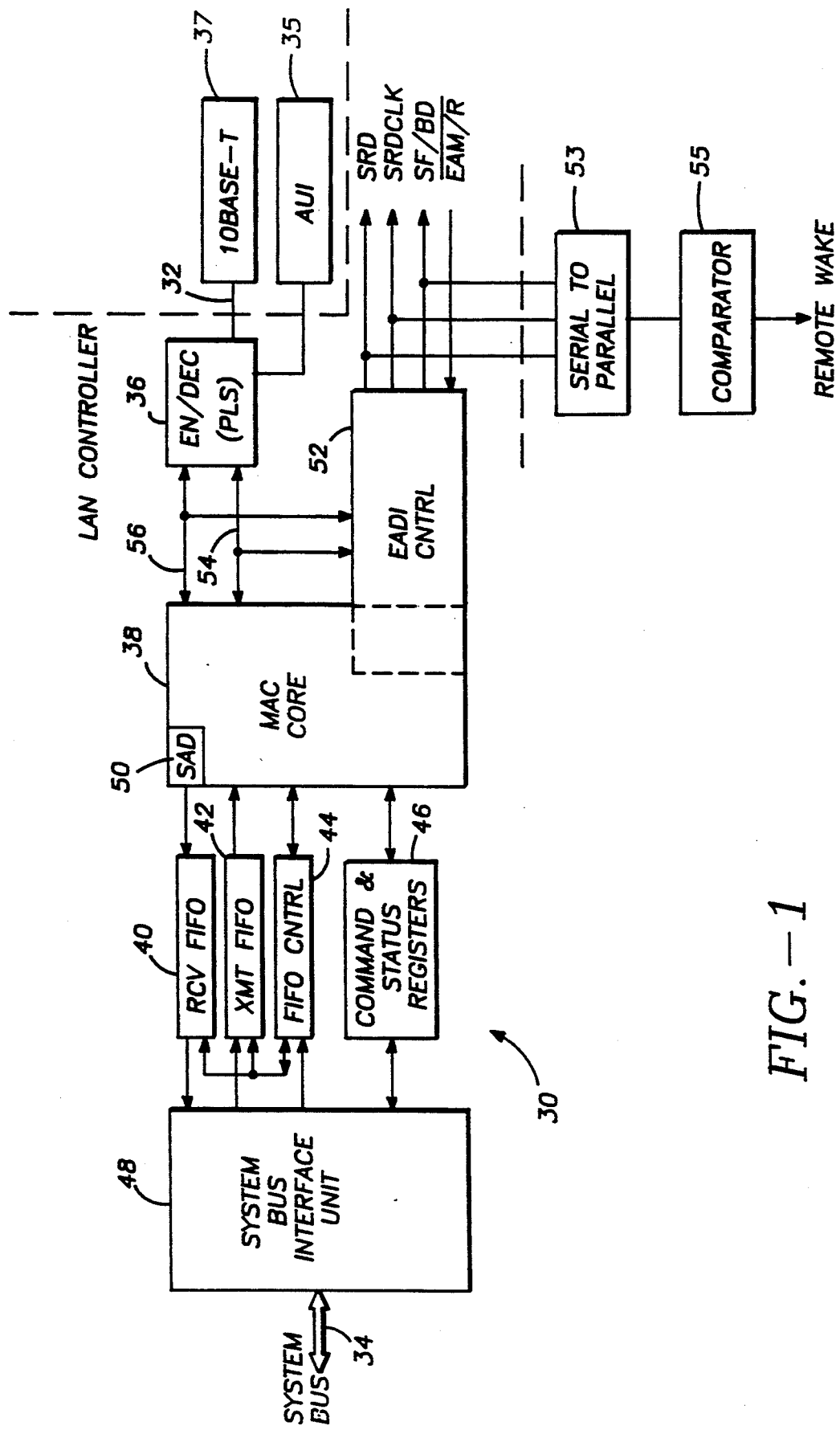
FIG. 1 is a block diagram of a media access controller incorporating the invention for an Ethernet network.

Turning now to the drawings, more particularly to FIG. 1, there is shown a media access controller (MAC) 30 used as an interface in an Ethernet data processing network. The MAC 30 controls the passage of information between a shared Ethernet serial data path 32 and a system bus 34. The MAC 30 includes a Manchester encoder/decoder 36 and a MAC core 38, which in the preferred embodiment, is implemented in accordance with the IEEE 802.3 standard. The MAC 30 also includes a receive FIFO 40, a transmit FIFO 42 and FIFO control logic 44 as well as command and control registers 46. A system bus interface unit 48 is logically disposed between the receive and transmit FIFOs 40 and 42 and the system bus 34. The MAC core 38 includes a station address detect (SAD) unit 50 which determines whether packets received by the MAC 30 in fact are addressed to it and should be captured in their entirety, or are addressed to a different MAC station (not shown) and should be rejected. The byte tracking system of this invention is incorporated in the system bus interface unit 48, transmit FIFO 42, MAC core 38 and Manchester encoder/decoder 36 of the MAC 30. The encoder/decoder 36 is connected to an Attachment Unit Interface (AUI) transceiver 35 and a 10BASE-T transceiver 37. Further background information on the Ethernet data processing network and the MAC 30 are provided in commonly owned Crayford, application Ser. No. 07/841,113, filed Feb. 24, 1992 and entitled, "Ethernet Media Access Controller with External Address Detection Interface and Associated Method," now U.S. Pat. No. 5,305,321, the disclosure of which is incorporated by reference herein.

Further details on the 10BASE-T transceiver 37, its connection to the MAC 30 and its connection to another 10BASE-T transceiver 37a are shown in FIG. 2. In operation, the 10BASE-T transceiver 37 outputs a link beat pulse 60 every 8-24 milliseconds. Detection of the link beat pulses 60 produced by the transceiver 37 by the transceiver 37a is used to establish that a link in the network is in place.

FIG. 3 shows a portion of another embodiment of a network system in which 10BASE-T transceivers 37' and 37a' each output a link beat pulse 60 every 8-24 milliseconds. Detection of the link beat pulses 60 produced by the other transceiver to which the transceivers 37' and 37a' are connected is used to establish that a link in the network is in place.

The "AUTO WAKE" (AWAKE) feature of the MAC 30 is specifically designed for use with mobile computing equipment, such as laptop or palmtop computers. The "REMOTE WAKE" (RWAKE) feature is intended for use in secure environments, providing a remote manager the capability of enabling or disabling a LAN station remotely, using a network command.

One of the fundamental benefits of the 10BASE-T physical interface for 802.3/Ethernet of FIG. 2 is that the health of the communications link can be permanently monitored. This is known as the Link Integrity Test. When in the "link good" condition, the 10BASE-T transceiver 37 is required to output a link status (LNKST) signal to this effect. The MAC 30, with the embedded 10BASE-T transceiver 37, uses the LNKST signal to provide power management to the MAC 30.

A $\overline{\text{SLEEP}}$ pin (not shown) on the MAC 30 is an input that allows the MAC 30 to be placed in one of its power saving modes. When $\overline{\text{SLEEP}}$ is active, all outputs will be placed in an inactive or high impedance state, providing that both the AWAKE bit and the RWAKE bit functions in a PHY Configuration Control register (not shown) are not enabled. This is the optimal mode for power saving, allowing clock inputs to the MAC 30 to be suspended. If the AWAKE bit is set prior to the activation of $\overline{\text{SLEEP}}$, the 10BASE-T receiver 37 and the $\overline{\text{LNKST}}$ output pin remain operational. If the RWAKE bit is set prior to $\overline{\text{SLEEP}}$ being asserted, the Manchester encoder/decoder 36, AUI cell and 10BASE-T cell 37 remain operational, as do the SRD, SRDCLK and SF/BD outputs. The input on XTAL1 must remain active for the AWAKE or RWAKE features to operate.

By using the programmable AWAKE bit, the receive section of the 10-BASE T transceiver 37 can remain powered, even if the $\overline{\text{SLEEP}}$ input to the MAC 30 is activated. This allows the transceiver 37 to detect a link beat pulse 60 or receive packet activity. If either receive condition is encountered, the internal transceiver 37 will activate the $\overline{\text{LNKST}}$ output from the MAC 30. The system hardware and/or software can use the $\overline{\text{LNKST}}$ output to take appropriate action. For instance, if the $\overline{\text{LNKST}}$ output is active (low), then the computer is connected to an active network, and it is likely that the operating system will allow the MAC 30 to remain powered. However, if the $\overline{\text{LNKST}}$ becomes inactive (high) then the system can assume that the link is inactive, and the MAC can be powered down to save power. If at a later time the link is re-established, the MAC 30 can be powered back up to take advantage of the communications channel. In this way, the power consumption of the Ethernet connection can be managed by the operating software/hardware.

By using the programmable RWAKE bit, the receive section of the 10BASE-T transceiver 37 and AUI port remain powered after the $\overline{\text{SLEEP}}$ input to the MAC 30 is activated. In addition, External Address Detection Interface (EADI) 52 is maintained operational. This allows data received on either the AUI or 10BASE-T receiver 37 to be passed to the EADI 52, via the Manchester decoder 36, and hence allows an external address or message detection circuit to observe the contents of the incoming packet. In this way, a system can be simply designed to provide a central manager station with the ability to control remotely the state of the MAC 30 and the associated computer station.

External circuitry can be implemented to interface to pins of the EADI 52, and effectively wait for a match based on a specific receive frame contents, in addition to just address alone. By way of example, a serial to parallel converter 53 and a comparator 55 of a terminal to which the MAC 30 is connected are shown. The comparator 55 provides a remote wake signal in response to a command from the central manager to reawaken from a sleep mode. This mode of operation effectively allows the MAC 30 and associated external logic to respond to specific frames on the network and thereby facilitate remote controlled node operation.

Some emerging network management protocols, such as the 3Com/IBM HLM Specification, already have the requirement to be able to control the node remotely. For applications requiring network controlled power or security management, the EADI 52 of the MAC 30 offers a unique solution. Not only can the station be remotely powered down, but with segregated power supply distribution, the MAC 30 and the associated EADI logic can remain active, and effectively wait for a command to reactivate the station. This function is referred to as the "Remote Wake" capability. Since the logic for "snooping" on the receive packet, and the power management distribution, is under the control of the system designer, the end station can implement security as simply as disabling the keyboard entry and/or display system, or a more sophisticated power down of all non-critical functions, such as the system CPU itself.

The AWAKE and RWAKE bits are located in the PHY Configuration Control (PHYCC) register of the MAC 30. All bits within the PHY Configuration Control register are cleared by hardware or software reset. Bit assignments are as shown in FIG. 4. Each bit has the function described in the following table:

| | | |
|---|---|---|
| Bit 7 | LNKFL | LNKFL reports the link integrity of the 10BASE-T receiver. When the link test function is enabled (DLNKTST = 0), the absence of link beat pulses on the Receive Data (RXD)±pair will cause the integrated 10BASE-T transceiver 37 to go into the link fail state. In the link fail state, data transmission, data reception, data loopback and the collision detection functions are disabled, and remain disabled until valid data or >5 consecutive link pulses appear on the RXD±pair. During link fail, the $\overline{\text{LNKST}}$ pin is internally pulled HIGH. When the link is identified as functional, the $\overline{\text{LNKST}}$ pin is driven LOW, and is capable of directly driving a "Link OK" LED. In order to inter-operate with systems which do not implement Link Test, this function can be disabled by setting the DLNKTST bit. With Link Test disabled (DLNKTST =1), the data driver, receiver and loopback functions as well as collision detection remain enabled irrespective of the presence or absence of data or link pulses on the RXD±pair. The transmitter will continue to generate link beat pulses during periods of transmit data inactivity. |
| Bit 6 | DLNKTST | Disable Link Test. When set, the integrated 10BASE-T transceiver 37 will be forced into the link pass state, regardless of receive link test pulses or receive packet activity. |
| Bit 5 | REVPOL | Reversed Polarity. Indicates the receive polarity of the RXD±pair. When normal polarity is detected, the REVPOL bit will be cleared, and the $\overline{\text{RXPOL}}$ pin (capable of driving a "Polarity OK" LED) will be driven low. When reverse polarity is detected, the REVPOL bit will be set, and the $\overline{\text{RXPOL}}$ pin should be externally pulled high. |
| Bit 4 | DAPC | Disable Auto Polarity Correction. When set, the automatic polarity correction will be disabled. Polarity detection and indication will still be possible via the $\overline{\text{RXPOL}}$ pin. |
| Bit 3 | LTS | Low Threshold Select. When set, the threshold of the twisted pair receiver will be reduced by 4.5 dB, to allow extended distance operation. |
| Bit 2 | ASEL | Auto Select. When set, the PORTSEL [1-0] bits are overridden, and the MAC 30 will automatically select the operating media interface port. When the 10BASE-T transceiver is in the link pass state (due to receiving valid packet data and/or Link Test pulses or the DLNKTST bit is set), the 10BASE-T port will be used. When the 10BASE-T port is in the link fail state, the AUI port will be used. Switching between the ports will not occur during transmission, to avoid any type of fragment generation. |
| Bit 1 | RWAKE | Remote Wake. When set prior to the $\overline{\text{SLEEP}}$ pin being activated, the AUI and 10BASE-T receiver sections and the EADI 52 will continue to operate even during $\overline{\text{SLEEP}}$. Incoming packet activity will be passed to the EADI 52 pins to allow detection of specific frame contents to be used to initiate removal of the $\overline{\text{SLEEP}}$ function. RWAKE must be programmed prior to $\overline{\text{SLEEP}}$ being asserted for this function to operate. RWAKE is not cleared by $\overline{\text{SLEEP}}$, only by activation of the SWRST bit or $\overline{\text{RESET}}$ pin. |
| Bit 0 | AWAKE | Auto Wake. When set prior to the $\overline{\text{SLEEP}}$ pin being activated, the 10BASE-T receiver section will continue to operate even during $\overline{\text{SLEEP}}$, and will activate the $\overline{\text{LNKST}}$ pin if receive activity is detected. AWAKE must be programmed prior to $\overline{\text{SLEEP}}$ being asserted for this function to operate. AWAKE is not cleared by $\overline{\text{SLEEP}}$, inly by activation of the SWRST bit or $\overline{\text{RESET}}$ pin. |

Figure 5B:
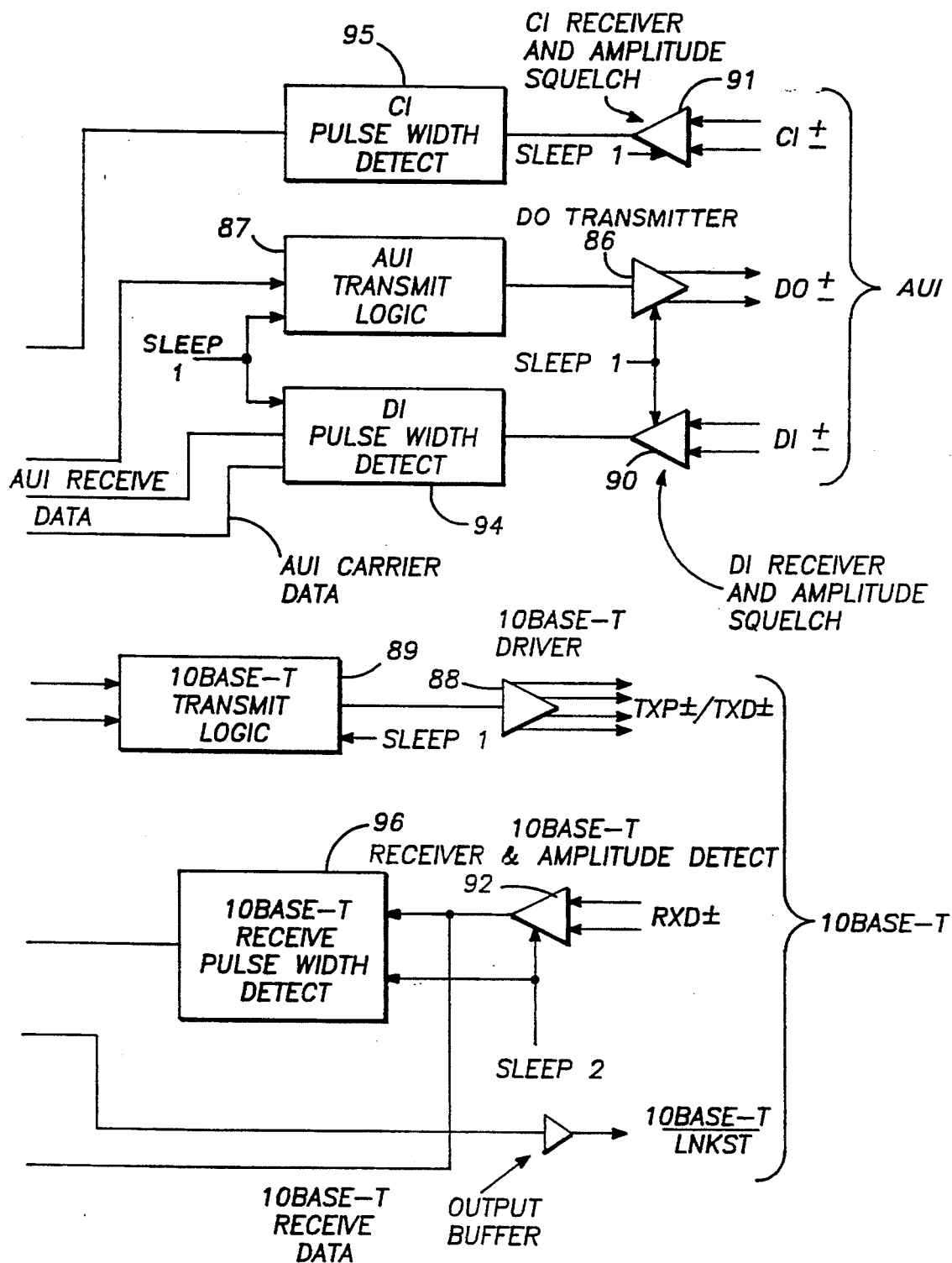
FIG. 5, formed of FIGS. 5A and 5B, is a more detailed block diagram of a portion of the media access controller of FIG. 1.

Further details of the MAC 30 as shown in FIG. 1 are provided in FIG. 5, which is formed of FIGS. 5A and 5B. FIGS. 5A and 5B should be combined such that the uppermost line of FIG. 5A (AUI COLLISION) is connected to the uppermost line of FIG. 5B (port to CI PULSE WIDTH DETECT). These diagrams are useful for understanding operation of the AUI and 10BASE-T circuits 35 and 37, and their interaction with the $\overline{\text{SLEEP}}$ pin and AWAKE/RWAKE bits. The MAC core cell 38 performs all of the 802.3/Ethernet transmit and frame assembly and interfaces through the bus interface unit 48 to the host system bus 34. Port multiplexer 80 allows the MAC 30 to select between the AUI interface 35 and the 10BASE-T interface 37, the latter two interface units shown in FIG. 1. The port selection process as such is not a part of the present invention and is therefore not described in detail, but it basically allows either manual selection (via programmable bits) or automatic selection (using the $\overline{\text{LNKST}}$ pin indication) of the media interface. Manchester encoder 82 and phase locked loop (PLL) and decoder 84 together form the Manchester encoder/decoder 36 (shown in FIG. 1).

Assuming normal ($\overline{\text{SLEEP}}$ inactive) operation, transmit data flow originates from the MAC 38, which is Manchester encoded at 82 and then passed to the appropriate AUI or 10BASE-T media driver 86 or 88 through transmit logic 87 or 89. Receive data flow may originate frown either the AUI or the 10BASE-T receiver 90 or 92. The receivers 90 and 92 first perform pulse amplitude detection. If the received waveform passes the amplitude criteria, pulse width detection is then performed at 94 or 96. In the case of the AUI, if pulse amplitude and width criteria are met, the signal is effectively qualified and passed to receive multiplexer 98 as AUI receive data and AUI receive carrier sense signals. Similarly, the AUI waveform is also received and amplitude tested by collision detection receiver 91 and tested for pulse width at 95. If the AUI waveform meets the amplitude and width criteria, an AUI collision signal is supplied to the port multiplexer to block AUI transmissions while an AUI waveform is being received. For the 10BASE-T receive path, data is further qualified by "smart squelch" 100, which in essence looks for multiple pulses in a specific order, to ascertain that this receive waveform is packet data and not noise. If the waveform passes this criteria, it is qualified and passed to the receive multiplexer 98 as 10BASE-T data and 10BASE-T receive carrier sense. The receive multiplexer 98 is set up to select one of the receive data paths (either by programming or automatically as previously discussed), allowing the receive data to be decoded from Manchester to non-return to zero (NRZ) format by the PLL/decoder 84, and passed to the MAC 38 through the port multiplexer 80.

In addition, for the 10BASE-T port, the transmission of link test pulses 60 (FIG. 3) on line 101 is controlled by 10BASE-T transmit link state machine 102, so that pulses arc: transmitted during periods of data (packet) inactivity. 10BASE-T receive link state machine 104 monitors the presence of receive link beat pulses or packet data, and asserts the $\overline{\text{LNKST}}$ pin if the link is considered operable.

SLEEP 1 and SLEEP 2 outputs from port multiplexer 80 are effectively set up by the condition of the AWAKE and RWAKE bits. If the $\overline{\text{SLEEP}}$ pin is activated, and AWAKE and RWAKE have not been programmed, SLEEP 1 and SLEEP 2 will be activated, shutting down the AUI and 10BASE-T transmit and receive functions. Note that 10BASE-T link test pulses will not be generated by the MAC 30 when the $\overline{\text{SLEEP}}$ pin is asserted, as an additional power saving feature. Note also that the entire MAC core portion 38 of the chip will be in a low power sleep mode, consuming minimal power.

If AWAKE is set and the $\overline{\text{SLEEP}}$ pin activated, SLEEP 1 is asserted, but SLEEP 2 is not. This powers down the entire AUI transmit and receive paths, and the 10BASE-T transmit path. However, the 10BASE-T receiver 92 remains powered, and the receive chain remains operable, including the ability to detect link test pulses.

If RWAKE is set and the $\overline{\text{SLEEP}}$ pin activated, SLEEP 1 and SLEEP 2 are not asserted. Both the AUI and 10BASE-T receivers 90 and 92 remain operable, as does the PLL/decoder 84. Data received will be passed to the port multiplexer 80, which will allow the EADI 52 output pins Serial Receive Data (SRD), Serial Receive Data Clock (SRDCLK) and Start Frame/Byte Delimiter (SF/BD) to be driven. The transmit portions of the AUI and 10BASE-T interfaces will not be in their most optimal power conservation mode, but will be static (no data and/or link test pulses will be transmitted). The MAC core 38 will of course be in its power saving mode. Since this mode is intended for "security" applications, the power conservation issue is not deemed as important. Note that the LNKST pin output buffer is active when in the normal operating mode or when AWAKE is set before $\overline{\text{SLEEP}}$ is asserted (it is not active during RWAKE operation).

It should now be readily apparent to those skilled in the an that a novel network connection system and method for operating a data processing network capable of achieving the stated objects of the invention has been provided. The data processing network controller operates in a sleep mode to conserve power, but a portion of the controller remains active to monitor for transmissions. Power consumption of a network connection is managed by operating software/hardware. A data processing network controller can be used to power down a terminal on a network from a central network system, and the terminal can also be powered up from the central network system. A portion of the network controller remains active to signal its presence to the network during the sleep mode.

It should further be apparent to those skilled in the art that various changes in form and details of the invention as shown and described may be made. It is intended that such changes be included within the spirit and scope of the claims appended hereto.

What is claimed is:

1. A network connection system comprising a network controller having a sleep mode and a transceiver for connecting said network controller to a data processing network, said network controller being configured for allowing a sleep mode for a data processing node connected to said network controller, the data processing network being configured to repetitively signal its presence to said transceiver when the data processing node is in the sleep mode and said data processing node being configured to awake from the sleep mode in response to said transceiver receiving a transmission including an instruction field including a node address for the data processing node and an awaking instruction.

2. The network connection system of claim 3 in which said transceiver is further configured to signal its presence to said data processing network when the data processing node is in the sleep mode.

3. The network connection system of claim 1, in which said network connection system including means for evaluating said received transmission when the data processing node is in the sleep mode.

4. The network connection system of claim 1 in which the transmissions include a node address and said means for evaluating transmissions is configured to determine if the node address of the transmissions identifies said data processing node.

5. The network connection system of claim 4 in which the transmissions further include an instruction field and said means for evaluating transmissions is further configured to determine if the instruction field of a transmission including the node address identifying said data processing node includes the awakening instruction for said data processing node.

6. A method for operating a data processing network, which comprises connecting a data processing node to a data processing network through a network controller and a transceiver, comprising the steps of:
   allowing a selected data processing node to assume a sleep mode;
   monitoring the data processing network with a portion of the transceiver for transmissions when the selected data processing node is in the sleep mode;
   periodically signalling the data processing network with the transceiver to signal presence of the transceiver on the data processing network; and
   awakening the selected data processing node from the sleep mode in response to receiving a transmission including an instruction field including a node address for the selected data processing node and an awakening instruction.

7. The method of claim 6 additionally comprising the step of initiating awakening of the network controller when a transmission on the data processing network intended for the selected data processing node is observed, wherein said network controller being configured to assume a sleep mode when the selected data processing node assuming a sleep mode.

8. A method for operating a data processing network, which comprises connecting a data processing node to a data processing network through a network controller and a transceiver, comprising the steps of:
   allowing a selected data processing node to assume a sleep mode;
   signalling a portion of the transceiver with the data processing network to signal presence of the data processing network when the selected data processing node is in the sleep mode; and
   awakening the selected data processing node from the sleep mode in response to said transceiver of the selected data processing node receiving a transmission including an instruction field including a node address for the selected data processing node and an awakening instruction.

9. The method of claim 8 additionally comprising the step of periodically signalling the data processing network with the transceiver to signal presence of the transceiver on the data processing network.

10. The method of claim 8 additionally comprising the steps of transmitting transmissions on the network to the data processing node through the transceiver and monitoring the transmissions by the data processing node.

11. The method of claim 10 in which the transmissions include an address field and the data processing node monitors the address field to determine if the address field includes the address identifying the data processing node.

12. The method of claim 11 in which the transmissions include an instruction field and the data processing node monitors the instruction field to determine if the instruction field includes the awakening instruction for the data processing node.

13. A network connection system for connecting a data processing node to a data processing network comprising:
   a network controller for allowing a selected data processing node connected to the network controller to be in a sleep mode;
   a transceiver for connecting the network controller to a data processing network, the transceiver being configured such that a portion of the transceiver can be selectively enabled to monitor for transmissions on the data processing network when the selected data processing node is in the sleep mode, and the transceiver being configured to awake the selected data processing node from the sleep mode in response to receiving a transmission including an instruction field including a node address for the selected data processing node and an awaking instruction;
   a transmitter; and
   a receiver comprising a data decoder and a data detector including a pulse amplitude detector, a pulse width detector, and a multiple pulse detector.

14. A network connection system for connecting a data processing node to a data processing network comprising:
   a network controller for allowing a selected data processing node connected to the network controller to be in a sleep mode;
   a transceiver for connecting the network controller to the data processing network, the transceiver being configured such that a portion of the transceiver can be selectively enabled to monitor for transmissions on the data processing network when the selected data processing node is in the sleep mode and the transceiver is further configured to initiate awakening of the network controller when a transmission on the data processing network intended for the data processing node is wherein said network controller being configured to assume a sleep mode when the selected data processing node assuming a sleep mode and
   the data processing network being configured to repetitively signal its presence to the transceiver when the data processing node is in the sleep mode.

15. A method for operating a data processing network, which comprises connecting a data processing node to a data processing network through a network controller and a transceiver, comprising the steps of:
   allowing a selected data processing node to assume a sleep mode;
   signalling a portion of the transceiver with the data processing network to signal presence of the data processing network when the selected data processing node is in the sleep mode;
   transmitting transmissions on the network to the selected data processing node through the transceiver;
   monitoring the data processing network with a portion of the transceiver for transmissions when the selected data processing node is in the sleep mode; and
   awakening said selected data processing node from the sleep mode in response to receiving a transmission including an instruction field including a node address for the selected data processing node and an awakening instruction.

16. The method of claim 15 additionally comprising the step of periodically signalling the data processing network with the transceiver to signal presence of the transceiver on the data processing network.

* * * * *

UNITED STATES PATENT AND TRADEMARK OFFICE
CERTIFICATE OF CORRECTION

PATENT NO. : 5,404,544
DATED : 4/4/95
INVENTOR(S) : CRAYFORD

It is certified that error appears in the above-indentified patent and that said Letters Patent is hereby corrected as shown below:

Claim 14, column 10, line 36, after "for the data processing node is" insert --observed--.

Signed and Sealed this

Third Day of March, 1998

BRUCE LEHMAN

*Attest:*

*Attesting Officer*      *Commissioner of Patents and Trademarks*